United States Patent
Terada et al.

(10) Patent No.: US 9,381,876 B2
(45) Date of Patent: Jul. 5, 2016

(54) WIRE-HARNESS ROUTING DEVICE

(75) Inventors: Tomoyasu Terada, Kosai (JP); Tsukasa Sekino, Kosai (JP); Seiji Iwahara, Kosai (JP); Masaki Yokoyama, Toyota (JP); Shinji Kato, Kosai (JP); Fumiaki Sato, Kariya (JP); Yasuhiro Sakakibara, Kariya (JP); Yasunori Takenaka, Kariya (JP); Toshio Araki, Kariya (JP); Ryuya Ishimaru, Kariya (JP); Tetsuya Kaisaku, Kariya (JP)

(73) Assignee: YAZAKI CORPORATION, Tokyo (JP)

( * ) Notice: Subject to any disclaimer, the term of this patent is extended or adjusted under 35 U.S.C. 154(b) by 770 days.

(21) Appl. No.: 13/810,017

(22) PCT Filed: Jul. 16, 2010

(86) PCT No.: PCT/JP2010/062072
§ 371 (c)(1),
(2), (4) Date: Apr. 2, 2013

(87) PCT Pub. No.: WO2012/008044
PCT Pub. Date: Jan. 19, 2012

(65) Prior Publication Data
US 2013/0181512 A1    Jul. 18, 2013

(51) Int. Cl.
*B60R 16/027* (2006.01)
*H02G 11/00* (2006.01)
*B60R 16/02* (2006.01)

(52) U.S. Cl.
CPC ............ *B60R 16/0215* (2013.01); *B60R 16/027* (2013.01); *H02G 11/00* (2013.01)

(58) Field of Classification Search
CPC ....... B60N 2/0705; B60N 2/206; B60N 2/071
USPC ............................. 307/10.1; 174/50, 651, 656
See application file for complete search history.

(56) References Cited

U.S. PATENT DOCUMENTS

| 6,227,578 | B1 | 5/2001 | Fukui et al. |
| 2001/0004022 | A1* | 6/2001 | Kobayashi .......... B60R 16/0207 |
| | | | 174/72 A |
| 2006/0185879 | A1* | 8/2006 | Kayumi ............... B60N 2/0705 |
| | | | 174/50 |

(Continued)

FOREIGN PATENT DOCUMENTS

| EP | 1 890 071 A2 | 2/2008 |
| JP | 2006-42457 A | 2/2006 |

(Continued)

OTHER PUBLICATIONS

Search Report issued by the European Patent and Trademark Office in European Patent Application No. 11828598.0 dated Feb. 12, 2014.

(Continued)

*Primary Examiner* — Rexford Barnie
*Assistant Examiner* — Thai Tran
(74) *Attorney, Agent, or Firm* — Sughrue Mion, PLLC

(57) ABSTRACT

The wiring-harness routing device 1 includes two wiring harness 10, a support body 3 mounted slidably at a rail 2 and supporting a seat, and a protector 4 sliding interlockingly with the support body 3 and leading the two wiring harnesses 10 to the seat. The protector 4 includes a pair of wiring-harness hold portion 43 holding the two wiring harnesses 10 led through an opening 20 into the rail 2 to be arranged in parallel; a lead portion arranged between the pair of wiring-harness hold portions 43, and passing the two wiring harnesses 10 therethrough, and extending with a cylindrical shape so as to go through the slit and be led to an outside of the rail 2; and a mount portion 68 attached at the support body 3 so as to have a gap allowing motion in the widthwise direction of the rail 2.

4 Claims, 19 Drawing Sheets

(56) References Cited

U.S. PATENT DOCUMENTS

| | | | |
|---|---|---|---|
| 2006/0199416 A1* | 9/2006 | Tsubaki | B60R 16/0215 439/352 |
| 2012/0024564 A1* | 2/2012 | Sekino | B60N 2/0705 174/68.3 |

FOREIGN PATENT DOCUMENTS

| | | | | |
|---|---|---|---|---|
| JP | 2009-143326 A | 7/2009 | | |
| JP | 2009-273319 A | 11/2009 | | |
| JP | WO 2010070970 A1 * | 6/2010 | | B60N 2/0705 |
| WO | 2010/070970 A1 | 6/2010 | | |

OTHER PUBLICATIONS

International Search Report for PCT/JP2010/062072 dated Aug. 17, 2010.

* cited by examiner

WIRE-HARNESS ROUTING DEVICE

TECHNICAL FIELD

This invention relates to a wiring-harness routing device, which routes a wiring harness between a car body, such as a floor of a car, and a slide body, such as a seat provided slidably about the car body.

BACKGROUND ART

A seat as a slide body may be provided slidably about a floor of a passenger room as a car body. At the seat, an electronic device such as a seat sensor sensing seating of a passenger is mounted. Therefore, various wiring-harness routing device routing a wiring harness between the floor and the seat is used for connecting the electronic device provide at the seat and the electronic device fixed at the floor in the car in which the slidable seat is provided (see Patent document 1).

A wiring-harness routing device 201 shown in FIGS. 19-21 was invented by the present inventors and filed to Japan Patent Office (Application number 2009-99100). The wiring-harness routing device 201 in patent pending routes a wiring harness 10 between a floor 207 (shown in FIG. 21) of a passenger room as a car body of a car and a seat 200 (shown in FIG. 19) provided slidably about the floor 207 as a slide body. A mat 208 is laid on the floor 207. The seat 200 is arranged above the floor 207 and the mat 208 along a direction Y.

The wiring-harness routing device 201 includes a wiring harness 10, a long-cylindrical shaped rail 2 fixed at the floor 207, a support body 203 mounted slidably at the rail 2 and supporting the seat 200, a protector 204 connected with the support body 203 so as to slide interlockingly with the support body 203 and lead the wiring harness 10 toward the seat 200, a receiving section 205 receiving an extra length of the wiring harness 10 to be curved into a U-shape, and a guide member 206 guiding the wiring harness 10 led out through an end of the rail 2 into the receiving section 205.

The above-mentioned wiring harness 10 is formed by a plurality of electric wires 12 and a corrugated tube 11 receiving the electric wires 12.

The above-mentioned rail 2 is formed as shown in FIG. 21 by a flat bottom wall 22 arranged on the floor 207, a pair of side walls 23 extending toward the seat 200 from both ends along a widthwise (direction X) of the bottom wall 22, that is upwardly, a pair of lower walls 24 extending from a top end of each side wall 23 so as to part from each other and face to the floor, a pair of second side walls 25 extending upwardly from each end at a side far from the side wall 23 of the lower walls 24, a pair of top walls 26 extending from a top end of each second side wall 25 so as to near to each other and face to the lower walls 24, and a pair of inner walls 27 extending from each end at a side far from the second side wall 25 of each top wall 26 toward the bottom wall 22. The rail 2 is formed to have the same cross-section between one end and the other end thereof along the lengthwise direction of the rail 2 (direction Z). In other words, the rail 2 is formed into a long cylindrical shape so as to have an opening 20 at each of the both ends along a lengthwise direction of the rail 2.

The above-mentioned pair of inner walls 27 has a gap therebetween and a gap between the bottom wall 22 and it. A slit 21 opening at a top side of the rail 2, that is a side near to the seat 200, is formed between the pair of inner walls 27 so as to extend from one end to the other end along a lengthwise direction of the rail 2. A pair of rooms 28a, 28b enclosed by the lower wall 24, the second side wall 25, the top wall 26 and the inner wall 27 is formed at the both sides along the direction X of the slit 21. A room 29 is formed under the slit 21 and the pair of rooms 28a, 28b so as to communicate the pair of rooms 28a, 28b to each other.

The support body 203 is arranged at an outside of the rail 2 as shown in FIGS. 20, 21, and formed by a seat mount member 230, a slide member 231 located in the rail 2, and a not-shown roller mounted at the slide member 231. An outer plate 232 arranged at one end in a widthwise direction of the slide member 231 and the roller mounted at the outer plate 232 are received slidably along the direction Z in the room 28a of the rail 2. An outer plate 233 arranged at the other end in the widthwise direction of the slide member 231 and the roller mounted at the outer plate 233 are received slidably along the direction Z in the room 28b of the rail 2.

The protector 204 is provided with a wiring-harness hold member 240 holding the wiring harness 10 led out from the receiving section 5 and led into the one room 28b of the rail 2, a lead-out member 241 extending L-shaped cylindrically from the wiring-harness hold member 240 so as to pass through the slit 21 of the rail 2 and a gap 208a of a mat 208 toward a passenger room and guiding the wiring harness 10 therethrough toward the seat 200, and a joint member 242 fixed and jointed at an end of the support member 203 by a bolt. The wiring-harness hold member 240 holds the wiring harness 240 by clamping one end of the corrugated tube 11. The lead-out member 241 passes an electric wire 12 led out from the one end of the corrugated tube 11 clamped by the wiring-harness hold member 240.

CITATION LIST

Patent Document 1: Japan Patent Application Publication No. 2006-42457

SUMMARY OF INVENTION

Objects to be Solved

The wiring-harness routing device according to the previous invention has a following problems. The wiring-harness routing device is formed so as to route the wiring harness 10 by using only one room 28b of the pair of rooms 28a, 28b of the rail 2. Thereby, there is a problem that a number of electric wires able to be routed therein is small. In the wiring-harness routing device 201, the protector 204 is fixed tightly with the support body 203 by a bolt. Thereby, a room for receiving the protector in the rail 2 is limited about a space, so that there is a problem that a number of electric wires able to be routed therein is small. When a number of electric wires able to be routed therein is small, a system installed in the seat 200 may be limited.

Reason why a room for receiving the protector in the rail 2 is limited about a space when the protector 204 and the support body 203 are fixed by a bolt in the wiring-harness routing device 201 is that the room for receiving the protector in the rail 2 is calculated by subtracting "a rattle gap in a widthwise direction of rail 2 to be generated when the support body 203 slides in the rail 2" and "tolerance of the support body 203 in the widthwise direction of the rail 2" (that is tolerance of the support member 203 by molding and tolerance by assembling it into the rail 2) and "tolerance of the protector 204 by molding" and "tolerance by assembling the support body 203 and the protector 204" from the an inner width of the rail 2.

For solving the above problem, an object of the present invention is to provide a wiring-harness routing device, which can increase a room for receiving a protector in a rail and route a large numbers of electric wires therein.

How to Attain the Object of the Present Invention

In order to overcome the above problems and attain the object, the present invention is to provide a wiring-harness routing device which routes a wiring harness between a car body and a slide body supported by a support body and includes a long-cylindrical rail fixed at a car body and having an opening provided at one end in a lengthwise direction of the rail; the support body provided slidably at the rail and a slit opening at a top surface of the rail; a protector sliding interlockingly with the support body, and holding the wiring harness led from the opening into the rail and leading the wiring harness through the slit toward an outside of the rail; and a receiving section receiving an extra length of the wiring harness led out from the opening, and is characterized in that two wiring harnesses can be arranged therein, and the protector includes a pair of wiring-harness hold members positioned in the rail and holding the two wiring harnesses to be arranged in parallel to each other along a widthwise direction of the rail; a lead member arranged between the pair of wiring-harness hold members, and passing electric wires of the two wiring harnesses therethrough, and extending with a cylindrical shape along a height direction of the rail so as to pass through the slit and be led to an outside of the rail; and a mount member attached at the support body so as to have a gap allowing motion in the widthwise direction of the rail. The wiring harness in the present invention is defined by having at least plurality of electric wires to be bound. The wiring harness can have an outer material such as a corrugate tube protecting the plurality of electric wires.

In the present invention according to claim, the support body includes a pair of projections arranged at an interval to each other along a widthwise direction of the rail, and projecting along a height direction of the rail; and the mount member includes a pair of U-shape hooks arranged at an interval to each other along the widthwise direction of the rail so as to make openings thereof face each other; and a distance between each surface of the pair of hooks facing each other is formed larger than a distance between outer surfaces of the pair of projections; and each of the pair of projections is positioned inside each of the pair of hooks so as to arrange the protector at the support body movably in the widthwise direction of the rail.

In the present invention according to claim, the receiving section is provided with a first receiving section curving the two wiring harnesses led from the opening of the rail into a U-shape to keep it in parallel, and a second receiving section curving furthermore the two wiring harnesses, which are curved into a U-shape by the first receiving section, into a U-shape to keep it in parallel.

In the present invention according to claim, the first receiving section includes a partition wall arranged between the two wiring harnesses.

Effects of the Invention

According to the present invention, as mentioned above, the wiring-harness routing device includes two wiring harnesses, and the protector having the pair of wiring-harness hold members positioned in the rail and holding the two wiring harnesses to be arranged in parallel to each other along the widthwise direction of the rail; the lead member arranged between the pair of wiring-harness hold members, and passing electric wires of the two wiring harnesses therethrough, and extending with a cylindrical shape along the height direction of the rail so as to pass through the slit and be led to the outside of the rail; and the mount member attached at the support body so as to have the gap allowing motion in the widthwise direction of the rail. Thereby, even if the support body slides with the rattle motion along the widthwise direction of the rail, the protector can move about the support body in the widthwise direction, so as to limit motion of the protector in the widthwise direction about the rail. Thus, the protector can slide against influence of rattle motion of the support body in the widthwise direction. When the support body has tolerance of a dimension in the widthwise direction of the rail, the tolerance of the dimension can be absorbed by the protector moving in the widthwise direction against the support body. Therefore, the room for receiving the protector in the rail, that is the room for receiving the wiring harness, can be increased. Thus, the room for receiving the protector can be increased, so that the wiring-harness routing device, in which a large number of electric wires can be routed, can be provide.

According to the present invention, the support body includes the pair of projections arranged at an interval to each other along the widthwise direction of the rail, and projecting along the height direction of the rail; and the mount member includes the pair of U-shape hooks arranged at an interval to each other along the widthwise direction of the rail so as to make openings thereof face each other; and the distance between each surface of the pair of hooks facing each other is formed larger than the distance between outer surfaces of the pair of projections; and each of the pair of projections is positioned inside each of the pair of hooks so as to arrange the protector at the support body movably in the widthwise direction of the rail. Thereby, the support body and the protector having a simple structure can be used, so that the wiring harness routing device which can be assembled easily can be provided.

According to the present invention, the receiving section is provided with the first receiving section curving the two wiring harnesses led from the opening of the rail into the U-shape to keep it in parallel, and the second receiving section curving furthermore the two wiring harnesses, which are curved into the U-shape by the first receiving section, into a U-shape to keep it in parallel. Thereby, the extra lengths of two wiring harnesses can be received in the receiving section. Therefore, the wiring-harness routing device by compact design can be provided.

According to the present invention, the first receiving section includes the partition wall arranged between the two wiring harnesses. Thereby, two wiring harnesses can be prevented from interference to each other near the opening of the rail. Therefore, the wiring-harness routing device, which can slide the two wiring harnesses and the protector smoothly, can be provided.

DESCRIPTION OF EMBODIMENTS

Figure 1:
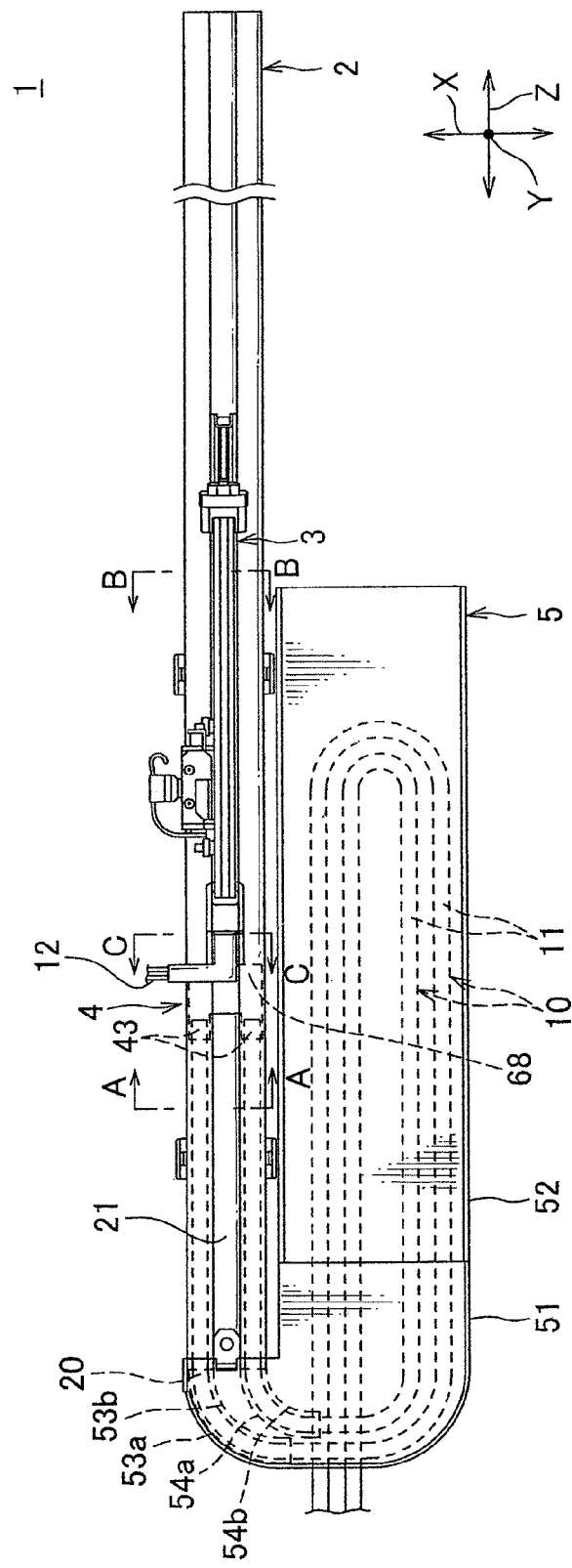
FIG. 1 is a plan view of a wiring-harness routing device of an embodiment according to the present invention.

A wiring-harness routing device of a preferable embodiment according to the present invention is described with reference to FIGS. 1-18.

The wiring-harness routing device 1 is for routing two wiring harnesses 10 between a floor of a passenger compartment as a car body of a car and a seat arranged slidably about the floor as a slide body. The seat includes an electronic device, for example, a seat sensor sensing sitting of a passenger at the seat and a seat-belt sensor sensing fastening a seat belt for the passenger sitting on the seat.

The wiring-harness routing device 1 includes the two wiring harnesses 10, a long cylindrical shape rail 2 fixed at the floor, a support body 3 provided slidably at the rail 2 and supporting the seat, a protector 4 sliding correspondingly to the support body 3 and guiding the two wiring harnesses 10 toward the seat and a receiving section 5 receiving an extra length of the two wiring harnesses 10.

An arrow Z in FIG. 1 indicates a sliding direction of the seat, that is a lengthwise direction of the rail 2. An arrow X in FIG. 1 indicates a widthwise direction of the rail 2. An arrow Y in FIG. 1 indicates a height direction and vertical direction of the rail 2.

The wiring harness 10 is formed by a plurality of electric wires 12 and a corrugate tube 11 receiving the electric wires 12. The electric wire 12 is a known covered wire and connects electrically the electronic device arranged at the seat and an electronic unit such an ECU (Electronic Control Unit) mounted at the floor, that is the car body. The corrugate tube 11 is made of synthetic resin such a polypropylene with a bellows-like cylindrical shape having small-diameter roots and large-diameter crests alternately, and protects the electric wires 12 by passing the electric wires 12 inside itself.

Figure 11:
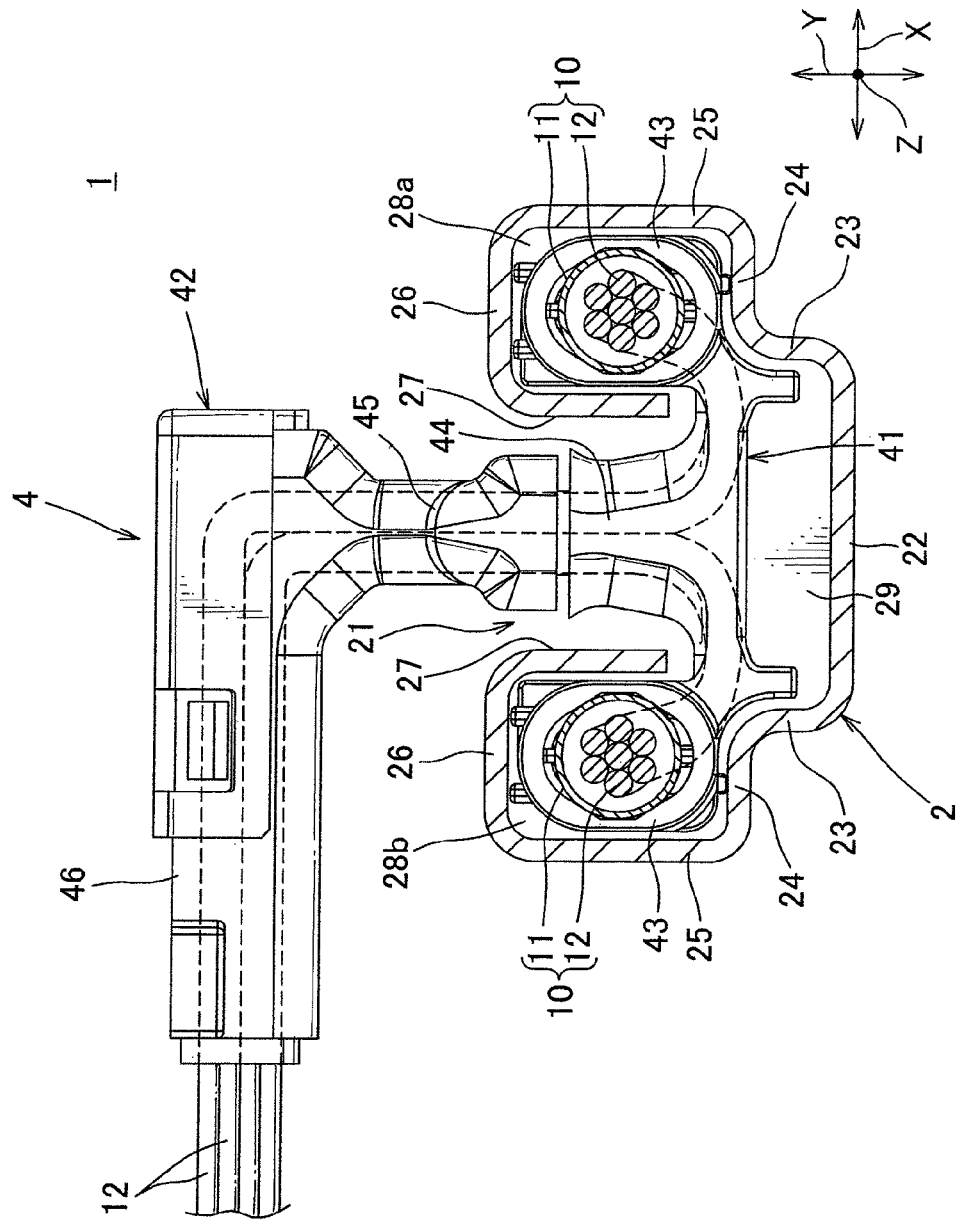
FIG. 11 is a cross-sectional view taken along the line A-A in FIG. 1.
Figure 12:
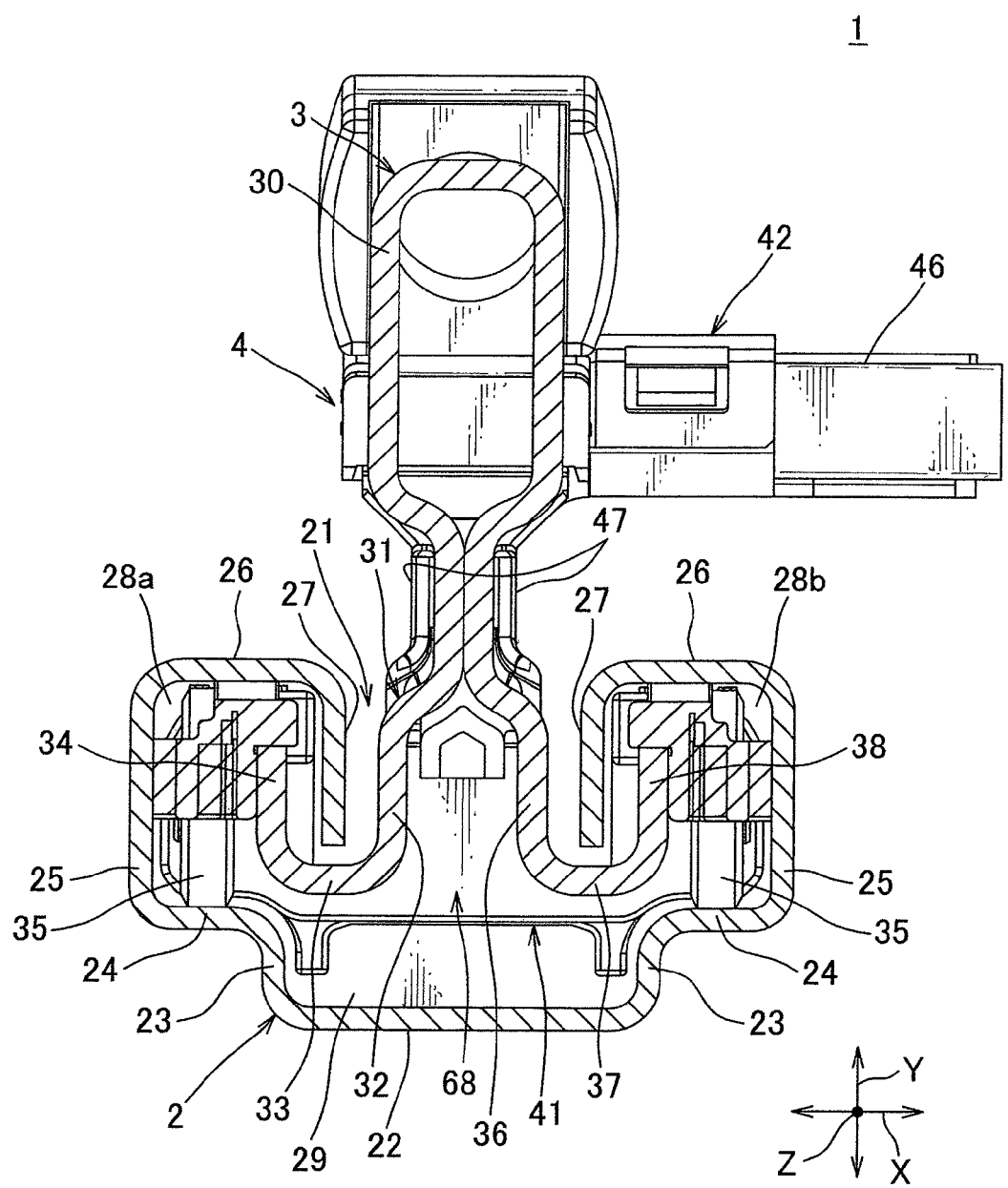
FIG. 12 is a cross-sectional view taken along the line B-B in FIG. 1.

The rail 2 is formed by cutting a long metal strip into a predetermined length and processing the cut metal strip by roller forming. As shown in FIGS. 11, 12, the rail 2 includes a flat bottom wall 22 laid on the floor, a pair of side walls 23 extending toward the sear, that is upwardly from each of both side ends along a widthwise direction (direction arrow X) of the bottom wall 22, a pair of lower walls 24 extending from an upper end of each side wall 23 so as to part from each other and correspond to the floor, a pair of second side walls 25 extending upwardly from each end apart from the side walls 23 of each lower wall 24, a pair of upper walls 26 extending from an upper end of each second side wall 25 so as to near each other and correspond to the lower walls 24 and a pair of inner walls 27 extending from an end apart from the second wall 25 of each upper wall 26 toward the bottom wall 22. The rail 2 is formed to have the same cross-section between one end and the other end thereof along a lengthwise direction of it (direction arrow Z). Thus, the rail is formed into a long cylindrical shape so as to have an opening 20 at the both ends thereof.

The pair of inner walls 27 is arranged so as to have a gap therebetween and a gap between the bottom wall 22 and itself. In other words, a slit 21 opening at a top surface of the rail 2, that is seat side surface, is formed so as to extend between the one end and the other end in a lengthwise direction of the rail 2. A pair of spaces 28a, 28b surrounded by the lower wall 24, the second side wall 25, the upper wall 26 and the inner wall 27 is formed at the both sides along the direction arrow X of the slit 21. A space 29 making the slit 21 communicate with the pair of spaces 28a, 28b is formed below the slit 21 and the pair of spaces 28a, 28b.

Figure 3:
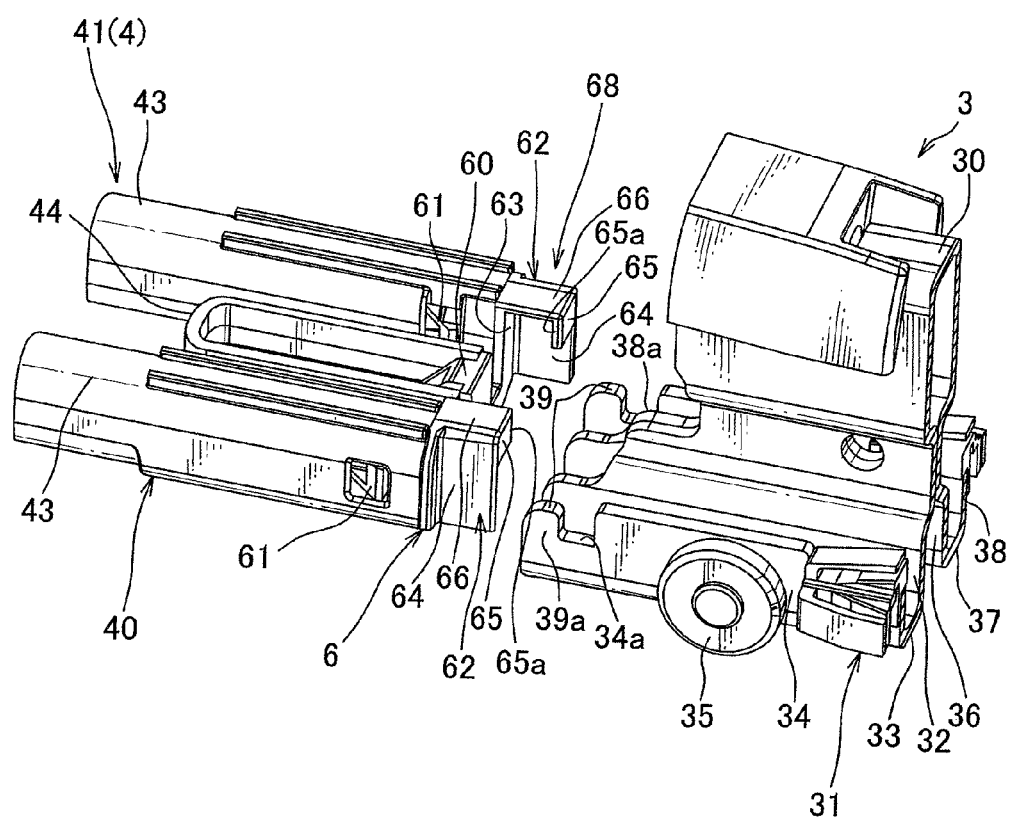
FIG. 3 is an exploded perspective view of the protector and support body shown in FIG. 2.

The support body 3 is formed to process a metal sheet by roller forming, pressing and welding, and arranged outside the rail 2 as shown in FIGS. 3 and 12. The support body 3 includes a seat mount portion 30, at which the seat is mounted; a slide portion 31 positioned in the rail 2; and a pair of projections 39, at which a later-described pair of hook portions 62 of the protector 4 is hooked.

The above-mentioned slide portion 31 includes a pair of inner plates 32, 36 extending with a plate shape downwardly from a bottom end of the seat mount portion 30; a pair of bottom portion 33, 37 extending from a bottom end of each inner plate 32, 36 so as to part from each other; a pair of outer plates 34, 38 extending with a plate shape upwardly, that is toward the seat mount portion 30, from an outer end apart from each other of the bottom portion 33, 37; and a plurality of wheels 35 mounted at each outer plate 34, 38. The one outer plate 34 and the wheel 35 mounted at the outer plate 34 are received slidably along the direction arrow Z in the space 28a of the rail 2. The other outer plate 38 and the wheel 35 mounted at the outer plate 38 are received slidably along the direction arrow Z in the space 28b of the rail 2.

Figure 2:
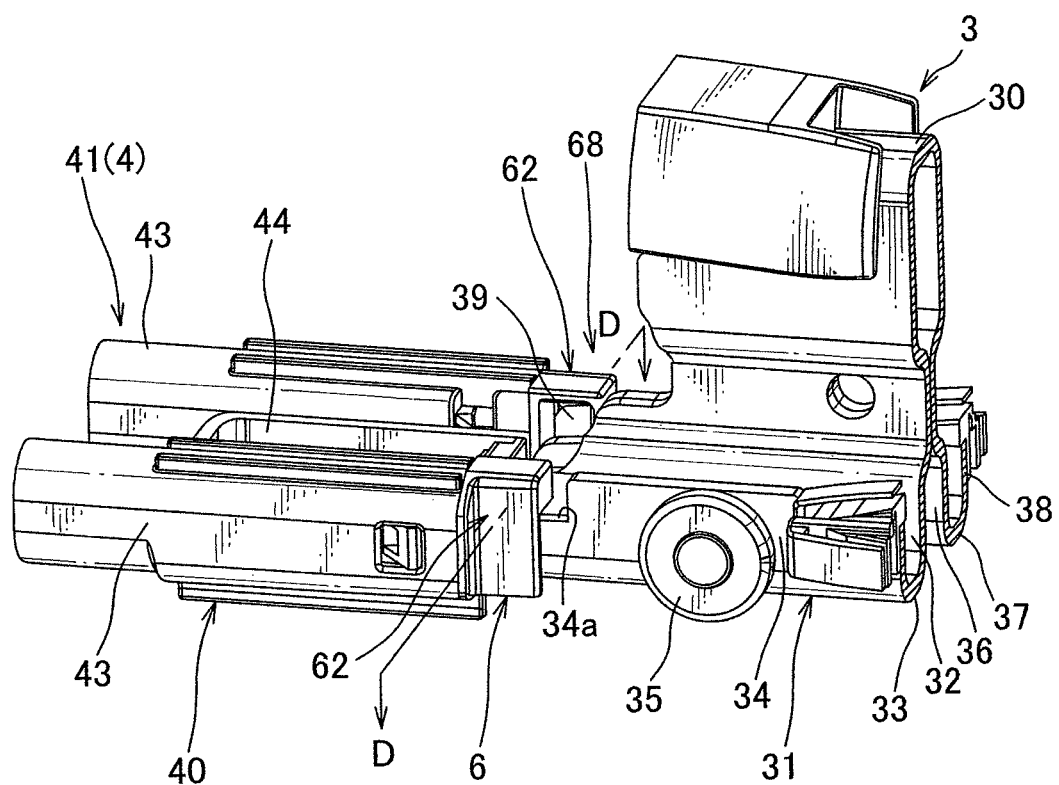
FIG. 2 is a perspective view of a part of a protector and a support body forming the wiring-harness routing device shown in FIG. 1.
Figure 4:
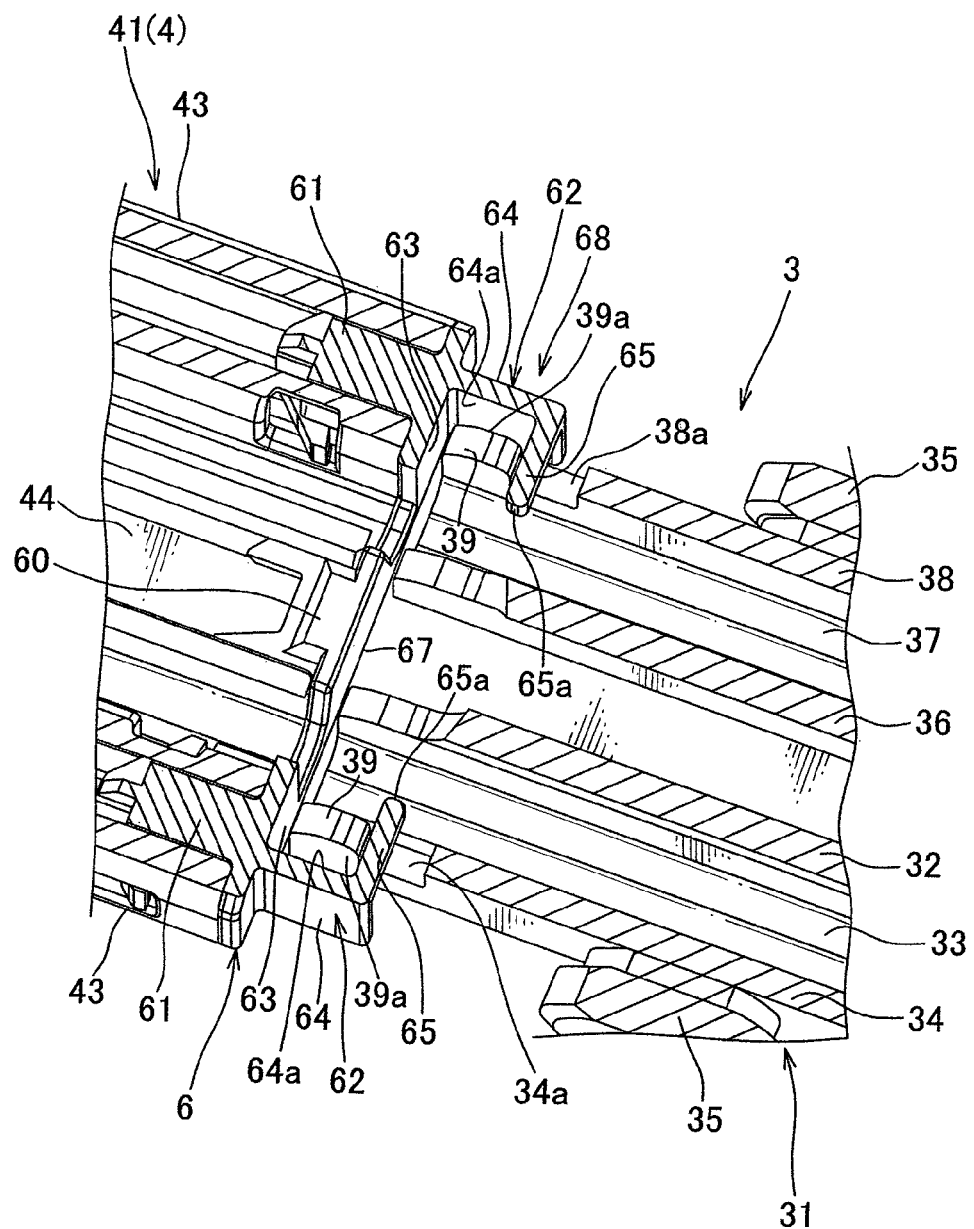
FIG. 4 is a cross-sectional view taken along the line D-D in FIG. 2.
Figure 5:
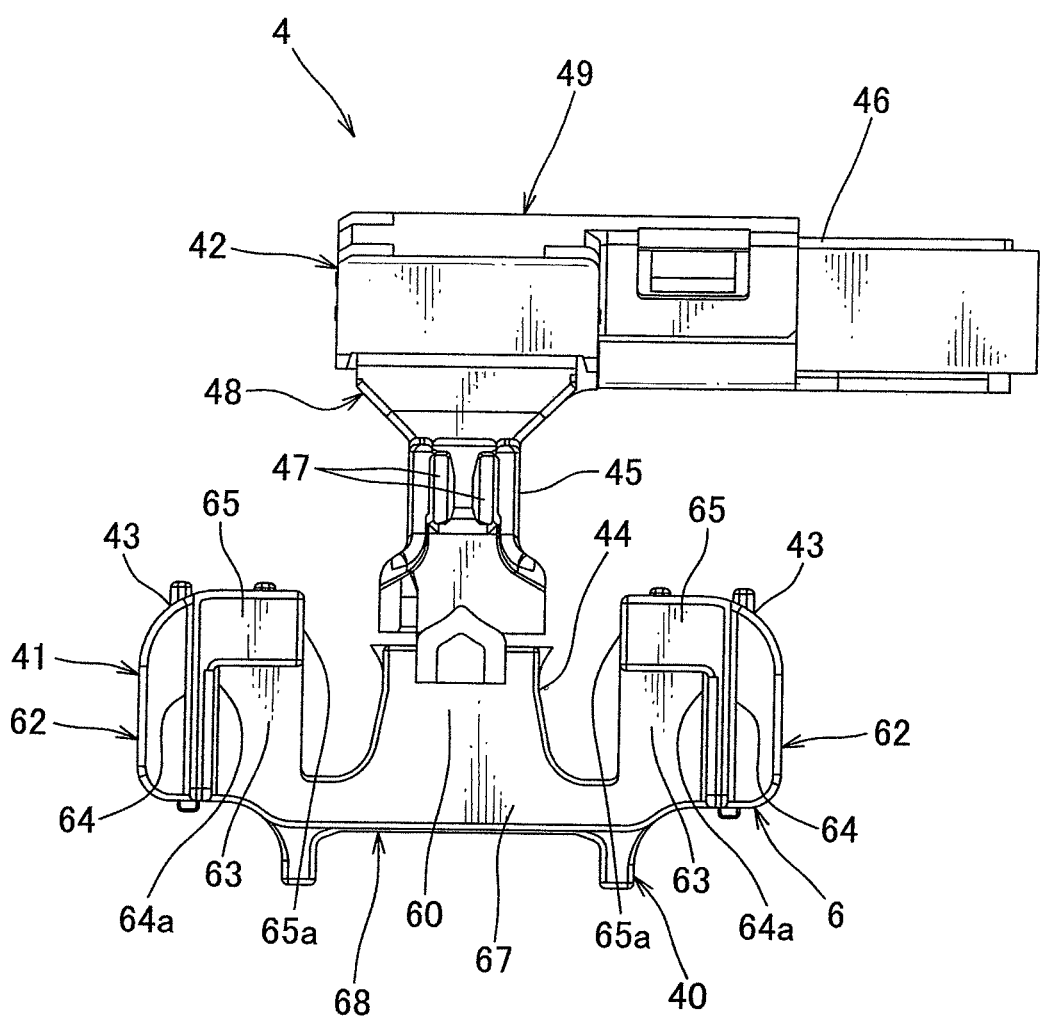
FIG. 5 is a front view of the protector forming the wiring-harness routing device shown in FIG. 1.
Figure 6:
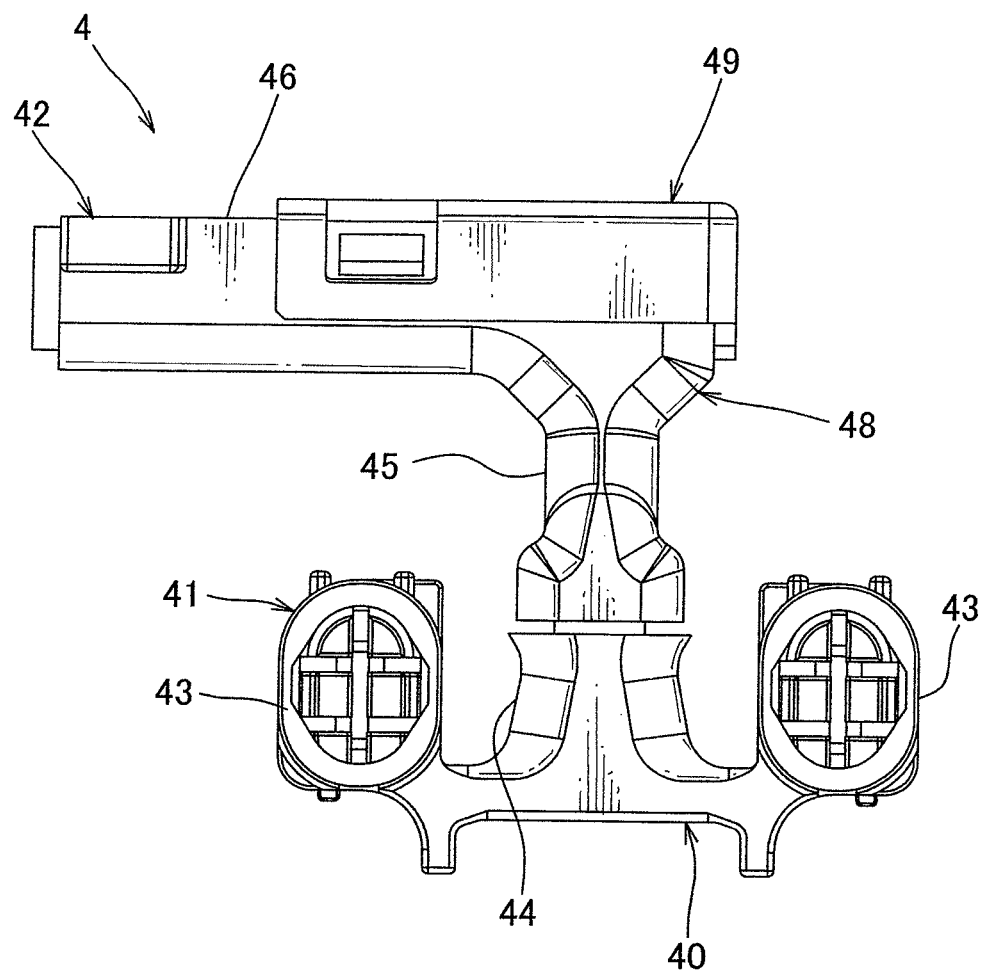
FIG. 6 is a rear view of the protector shown in FIG. 5.
Figures 7, 8:
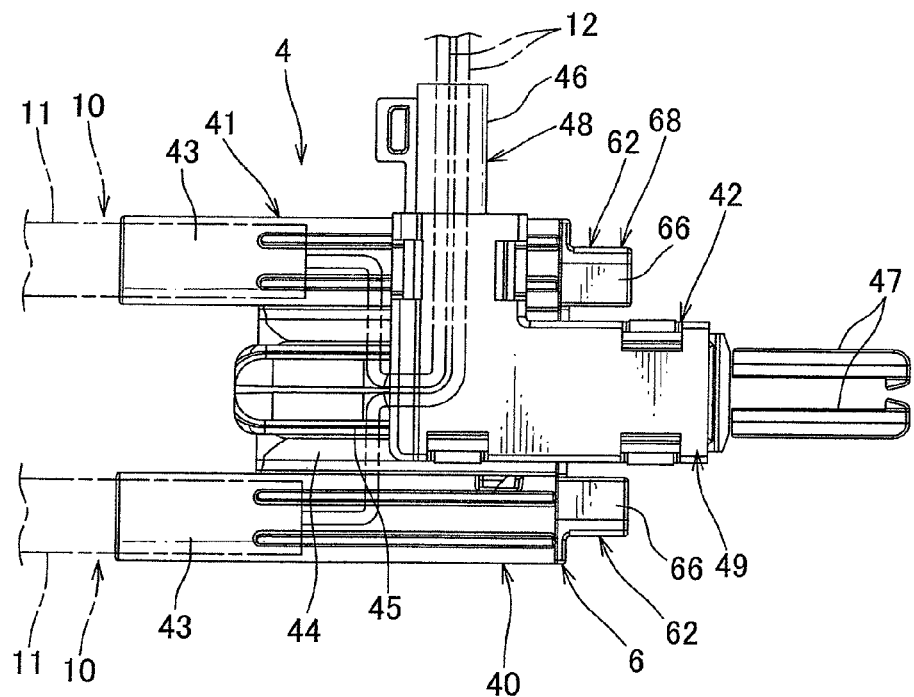
FIG. 7 is a plan view of the protector shown in FIG. 5.
FIG. 8 is a bottom view of the protector shown in FIG. 5.
Figure 9:
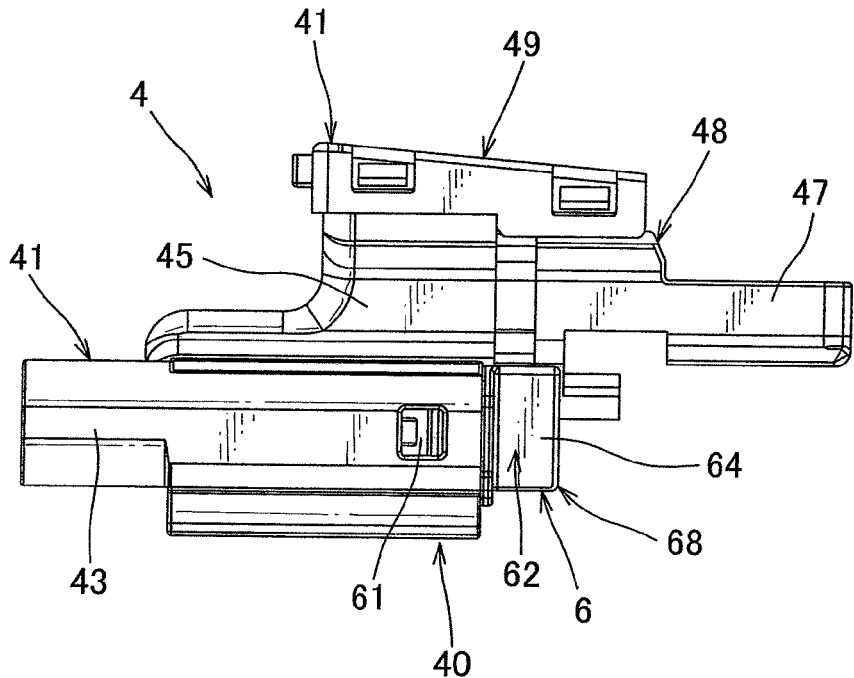
FIG. 9 is a left side view of the protector shown in FIG. 5.
Figure 10:
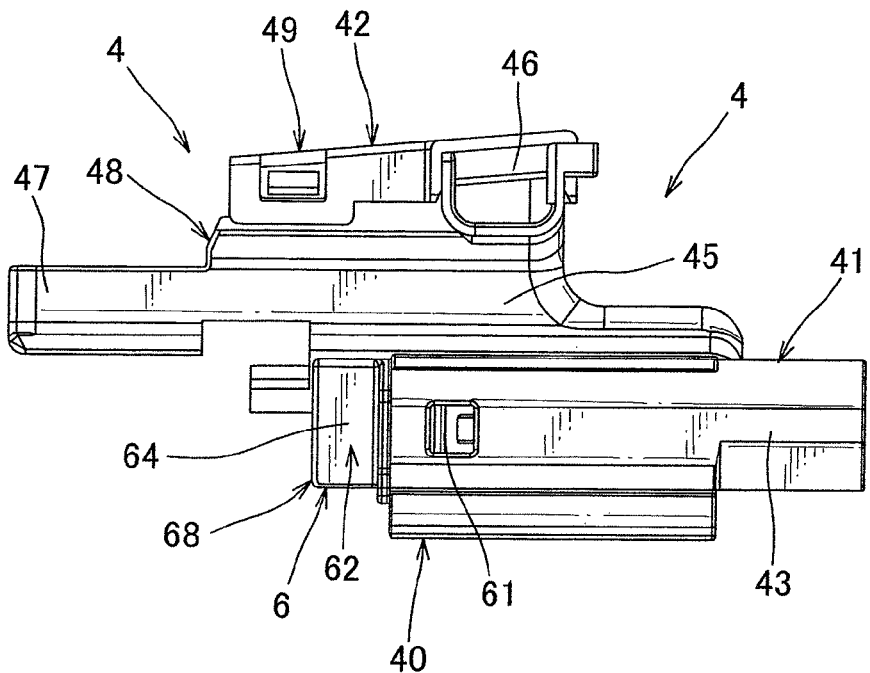
FIG. 10 is a right side view of the protector shown in FIG. 5.

As shown in FIGS. 2-4, the pair of projections 39 is provided at each one end along the direction arrow Z of the pair of outer plate 34, 38. The pair of projections 39 is formed so as to project from the bottom plate 33, 37 toward the seat mount portion 30 by cutting out the outer plate 34, 38 so as to create each cut-out 34a, 38a. In other words, the pair of projections 39 projects in a height direction (direction arrow Y) of the rail 2 and is arranged at interval to each other along the widthwise direction (direction arrow X) of the rail 2.

The protector 4 holds the two wiring harnesses 10 led through the opening 20 provided at the one end of the rail 2 into the pair of spaces 28a, 28b of the rail 2, and leads the two wiring harnesses 10 through the slit 21 out of the rail 2 toward the seat.

As shown in FIGS. 5-12, the protector 4 includes a pair of wiring-harness hold portions 43 arranged in the rail 2 and holding the two wiring harnesses 10 so as to arrange the two wiring harnesses 10 in parallel along the widthwise direction of the rail 2; a first lead portion 44 arranged between the pair of wiring-harness hold portion 43, and extending with cylindrical shape along the height direction of the rail 2 so as to pass the two wiring harnesses 10 inside itself; a second lead portion 45 communicating with the first lead portion 44, and extending with a cylindrical shape along the height direction of the rail 2 so as to go through the slit 21 outside the rail 2 and passing the two wiring harnesses 10 inside itself; a third lead portion 46 communicating with the second lead portion 45, and extending with a cylindrical shape so as to pass the two wiring harnesses 10 inside itself; amount portion 68 mounted at the support body 3 with a gap so as to be movable in the widthwise direction of the rail 2; and a pair of lock portions 47 locked to the support body 3.

The pair of wiring-harness hold portions 43 is formed into a cylindrical shape extending along the lengthwise direction of the rail 2, and arranged at interval to each other along the widthwise direction of the rail 2. The pair of wiring-harness hold portions 43 positions and holds one end of the corrugate tube 11 of the wiring harness 10 inside itself. According to the embodiment, the wiring harness 10 is held by molding the one end of the corrugate tube 11 in the wiring-harness hold portion 43 by insert-molding. Such pair of wiring-harness hold portions 43 is received slidably along the direction arrow Z in the pair of spaces 28a, 28b of the rail 2.

The first lead portion 44, the second lead portion 45 and the third lead portion 46 pass the electric wires 12 led from the one end of the corrugate tube 11 held by the wiring-harness hold portion 43 inside themselves. The first lead portion 43 and the second lead portion 45 correspond to "lead member" in claims.

According to the present invention, the pair of wiring-harness hold portion 43 is provided at the protector 4, so that one protector 4 can hold the two wiring harnesses 10. Also one rail 2 can route the two wiring harnesses 10.

The above-mentioned protector 4 is formed by a lower protector 41 and an upper protector 42 which were formed as separated bodies from each other. The lower protector 41 includes a first member 40 made of synthetic resin and having the pair of wiring-harness hold portions 43 and the first lead portion 44, and a second member 6 made of synthetic resin and having the mount portion 68, which are assembled to each other. The lower protector 41 is mounted at the support body 3 by hooking a later-described pair of hooks 62 of the mount portion 68 on a pair of projections 39. The upper protector 42 includes a upper protector main body 48 made of synthetic resin and having the second lead portion 45, the third lead portion 46 and the pair of lock portions 47, and a cover 49 made of synthetic resin and covering an opening provided at the upper protector 48, which are assembled to each other. The upper protector 42 is mounted at the support body 3 by locking the pair of lock portions 47 with the support body 3. Thus, as the protector 4, the lower protector 41 and the upper protector 42 are respectively mounted at the support body 3. The lower protector 41 and the upper protector 42, which are mounted at the support body 3, slide together with the support body 3.

Detail structure of the lower protector 41 is described hereafter. As mentioned above, the first member 40 is provided with the pair of wiring-harness hold portions 43 and the first lead portion 44 arranged between the pair of wiring-harness hold portions 43. The pair of wiring-harness hold portions 43 is formed into a cylindrical shape having an opening at each of the both ends along the lengthwise direction of the rail 2. The first lead portion 44 is continued to an outer surface of the pair of wiring-harness hold portion 43 and extends cylindrically along the height direction of the rail 2. The first lead portion 44 is provided with an opening, which opens at a side near the second lead portion 45 and an opening, which opens at a side surface of the side. An outer surface of the pair of wiring-harness hold portions 43 is provided with a passing hole communicating an inner space of the wiring-harness hold portion 43 and an inner space of the first lead portion 44.

Each of the two wiring harnesses 10 is passed from each opening of the pair of wiring-harness hold portions 43 into each wiring-harness hold portion 43, and the one end of the corrugate tube 11 is held at the wiring-harness hold portion 43. The electric wires 12 led out of the one end of the corrugate tube 11 are passed through the passing hole in the first lead portion 44 toward the second lead portion 45.

the second member 6 is provided with a pressure lock portion 60 which is press-locked at the opening so as to cover the opening which opens at the side surface of the first lead portion 44; a pair of pressure lock portions 61 arranged at both side of the pressure lock portion 60 and press-locked into the other opening so as to cover the other opening of each of the pair of wiring-harness hold portion 43; and the above-mentioned mount portion 68.

The mount portion 68 is provided with a pair of hook portions 62 continued to each of the pair of press-lock portions 61 and arranged at interval to each other along the widthwise direction of the rail 2; and a connecting portion 67 connecting the pair of hook portions 62 and the pressure lock portion 60.

The pair of hook portions 62 is provided with a first wall 63 formed into a plate shape to be continued to an end of the press-lock portion 61; a second wall 64 extending at an opposite side from the press-lock portion 61 vertically from a surface of the first wall 63; a third wall 65 extending vertically from an end apart from the first wall 63 of the second wall 64 so as to face on the first wall 63; and a top wall 66 continued to a top end portion of the first wall 63, a top end portion of the second wall 64 and a top end portion of the third wall 65. The second walls 64 of the pair of hook portions 62 face in the widthwise direction of the rail 2. In other words, each of the pair of hook portions 62 is formed to have a U-shape cross-section opening oppositely to each other by the first wall 63, the second wall 64 and the third wall 65.

Figure 13:
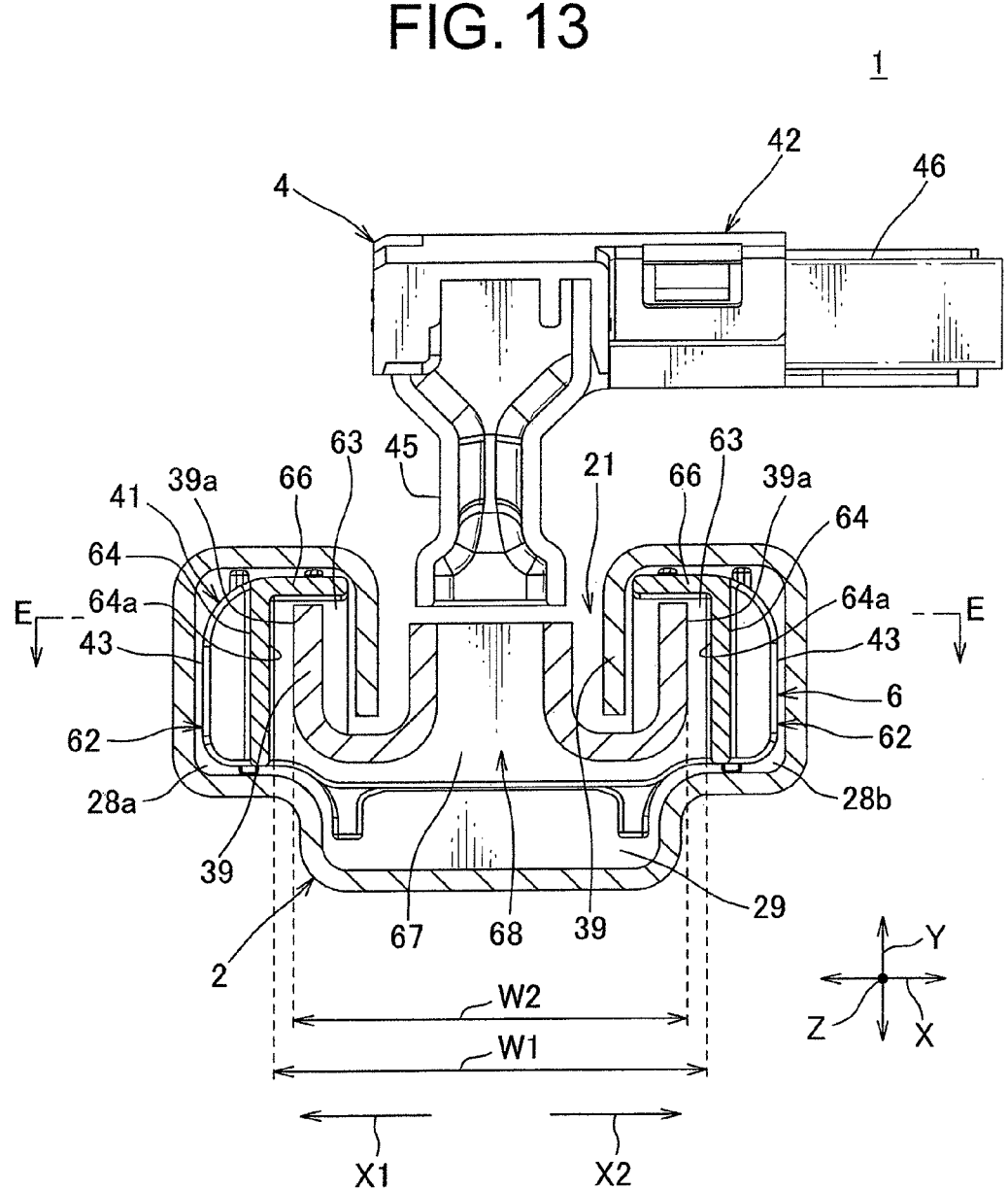
FIG. 13 is a cross-sectional view taken along the line C-C in FIG. 1.
Figure 14:
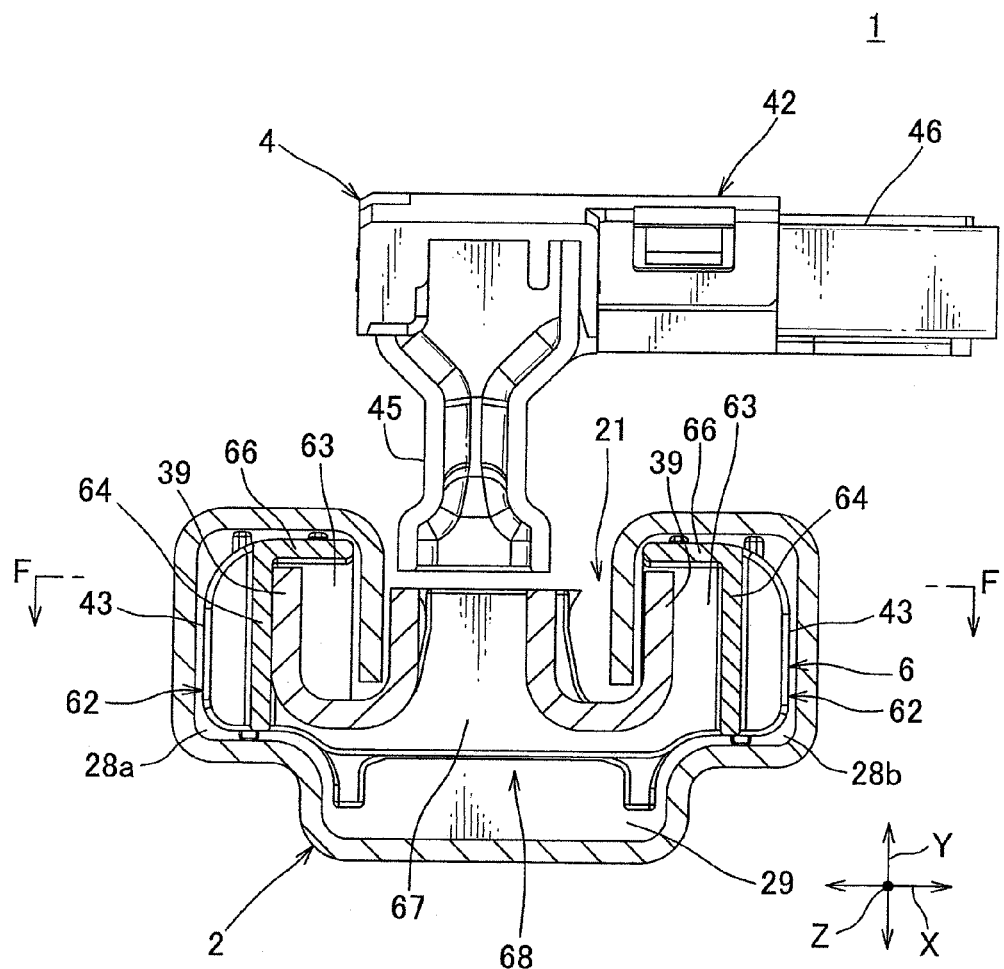
FIG. 14 is a cross-sectional view showing the support body shown in FIG. 13 shifted in a direction arrow X1.
Figure 15:
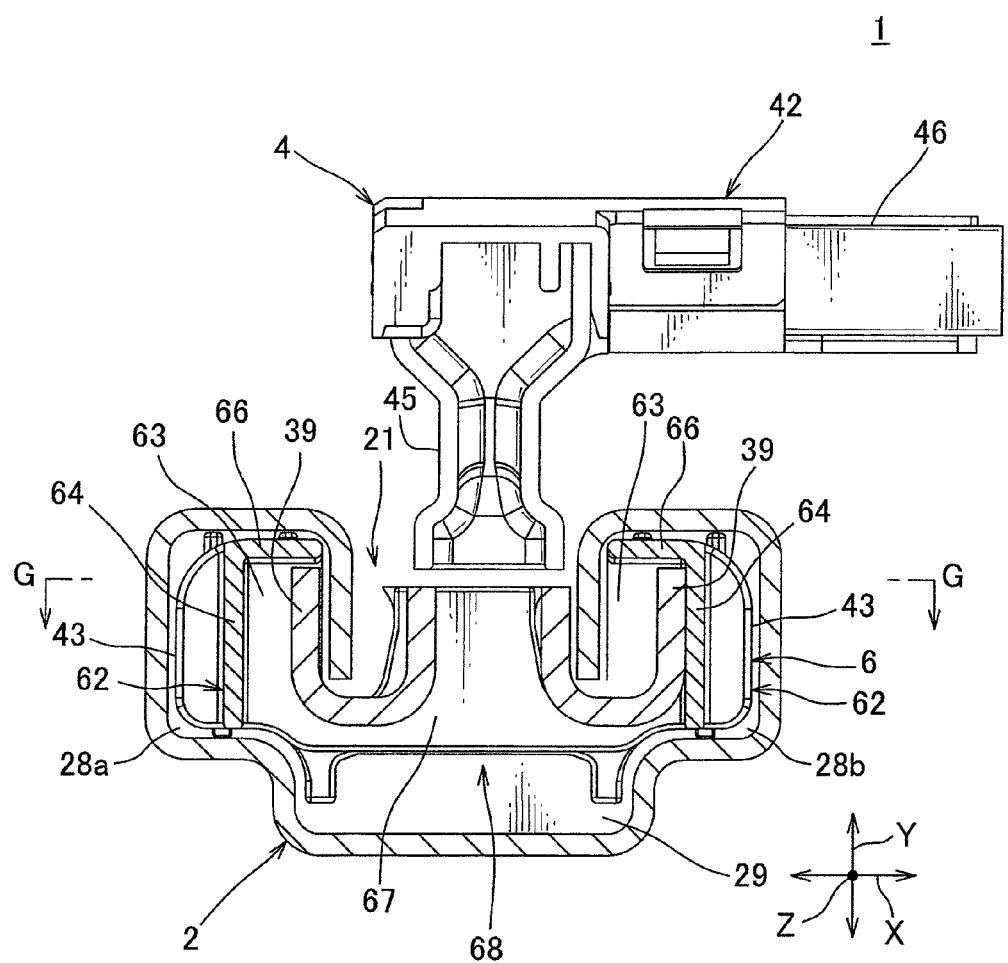
FIG. 15 is a cross-sectional view showing the support body shown in FIG. 13 shifted in a direction arrow X2.
Figure 16:
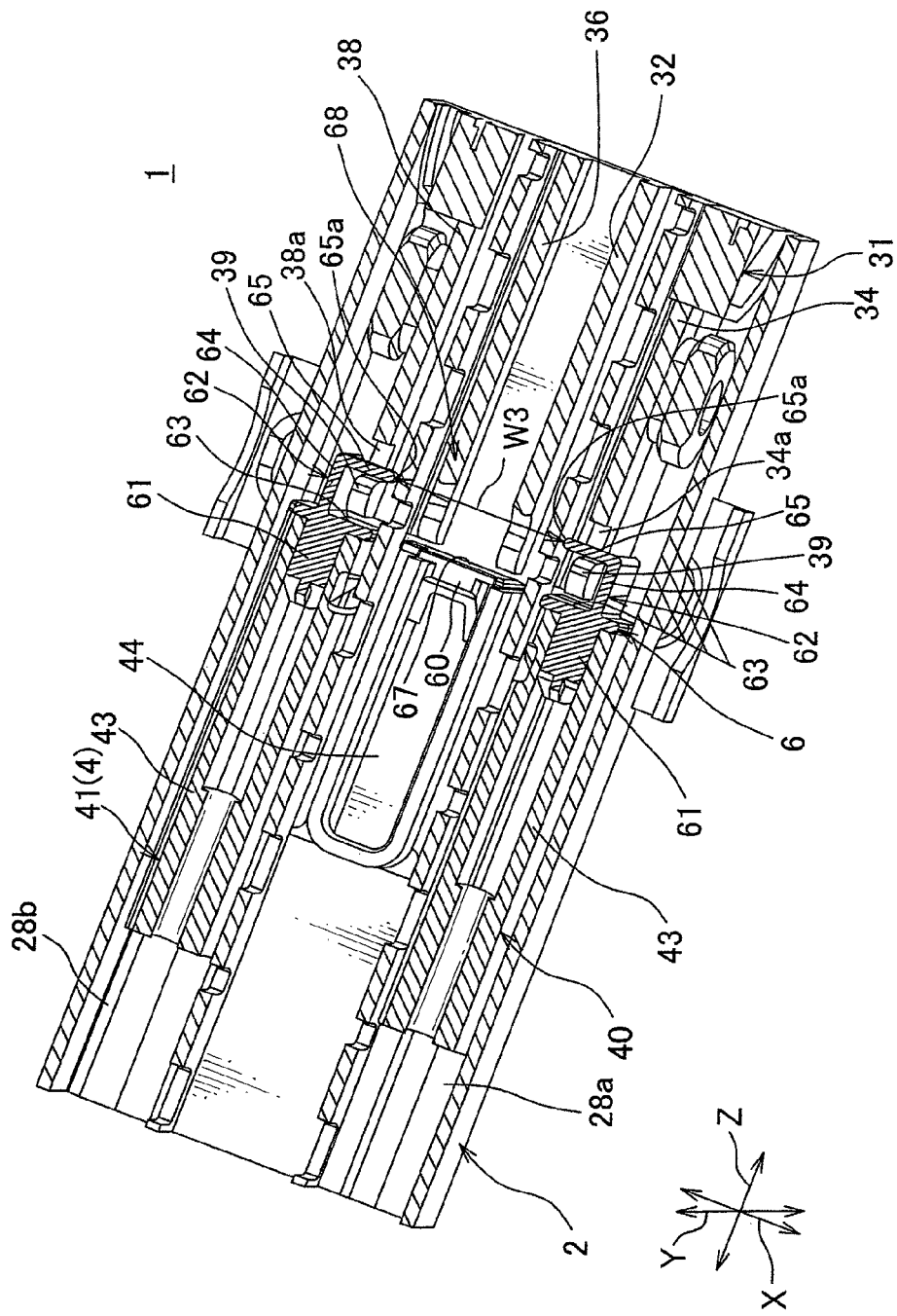
FIG. 16 is a cross-sectional view taken along the line E-E in FIG. 13.
Figure 17:
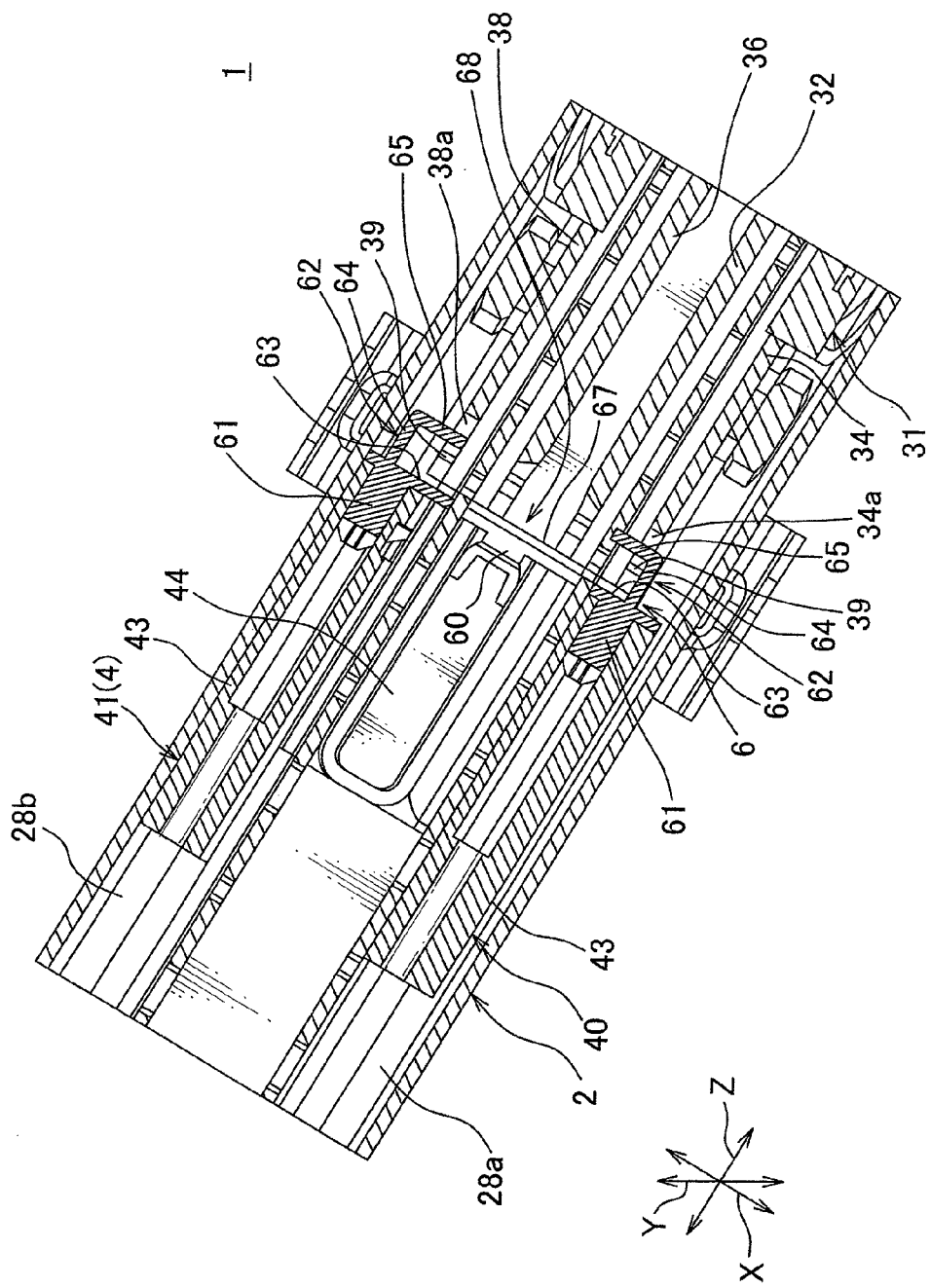
FIG. 17 is a cross-sectional view taken along the line F-F in FIG. 13.
Figure 18:
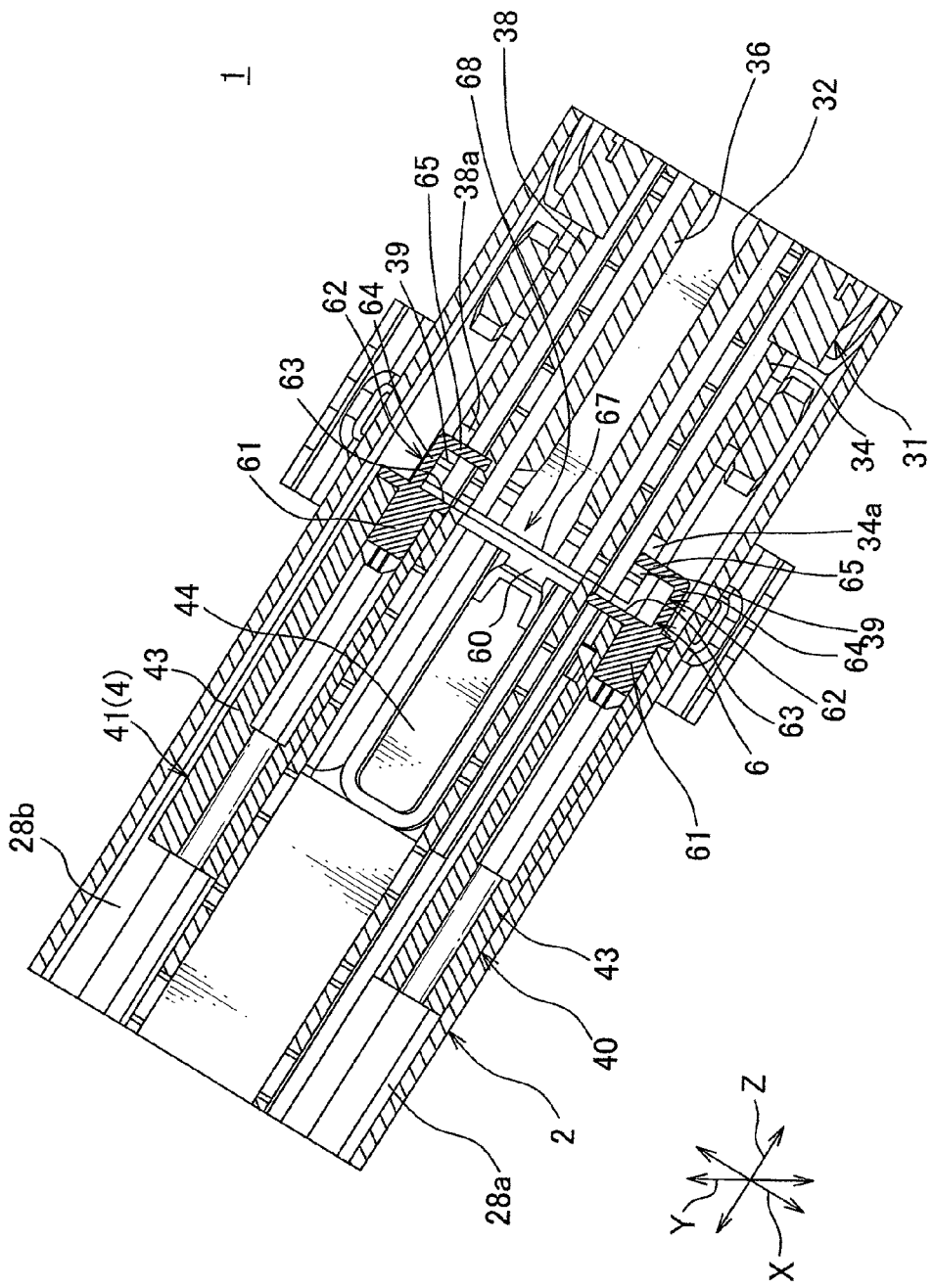
FIG. 18 is a cross-sectional view taken along the line G-G in FIG. 13.
Figure 19:
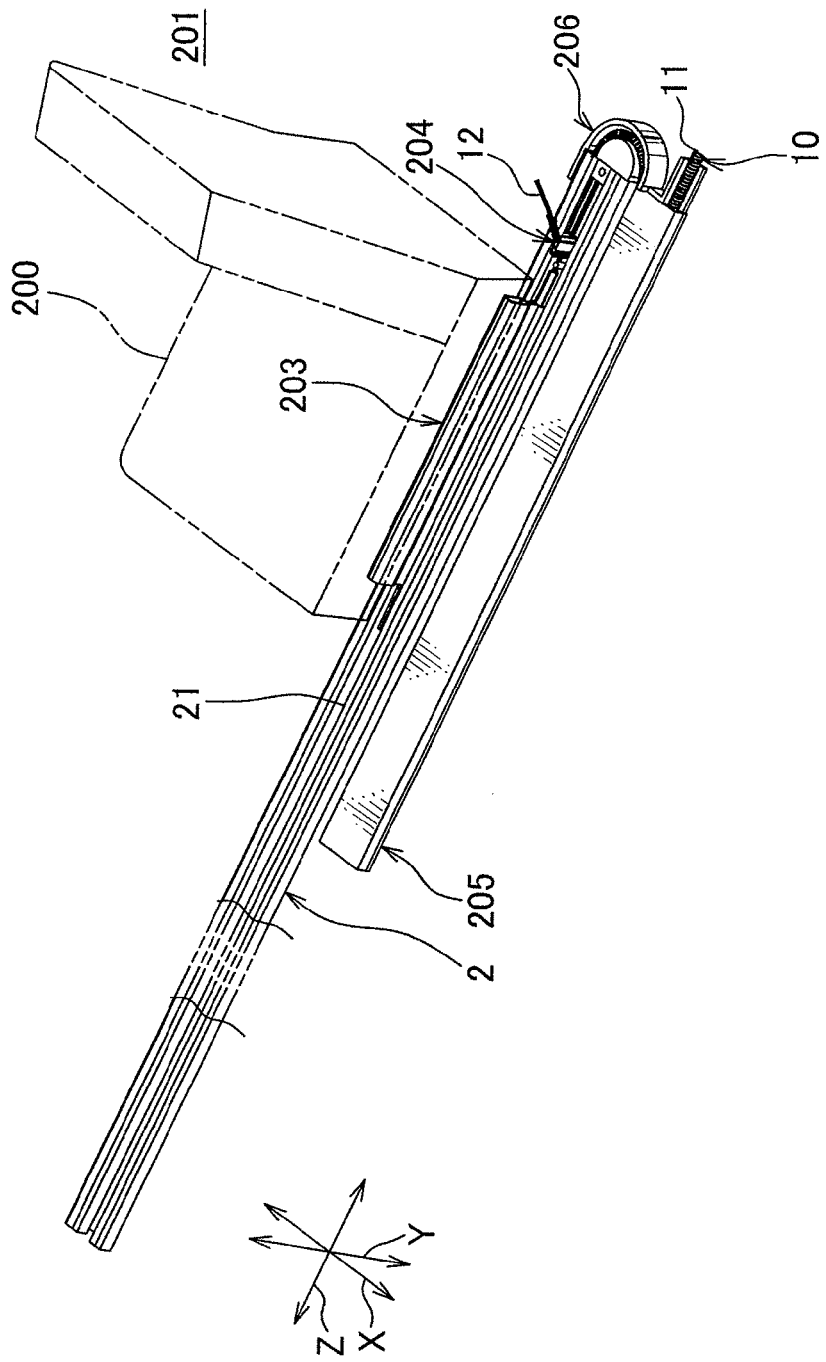
FIG. 19 is a perspective view of a wiring-harness routing device by prior art.
Figure 20:
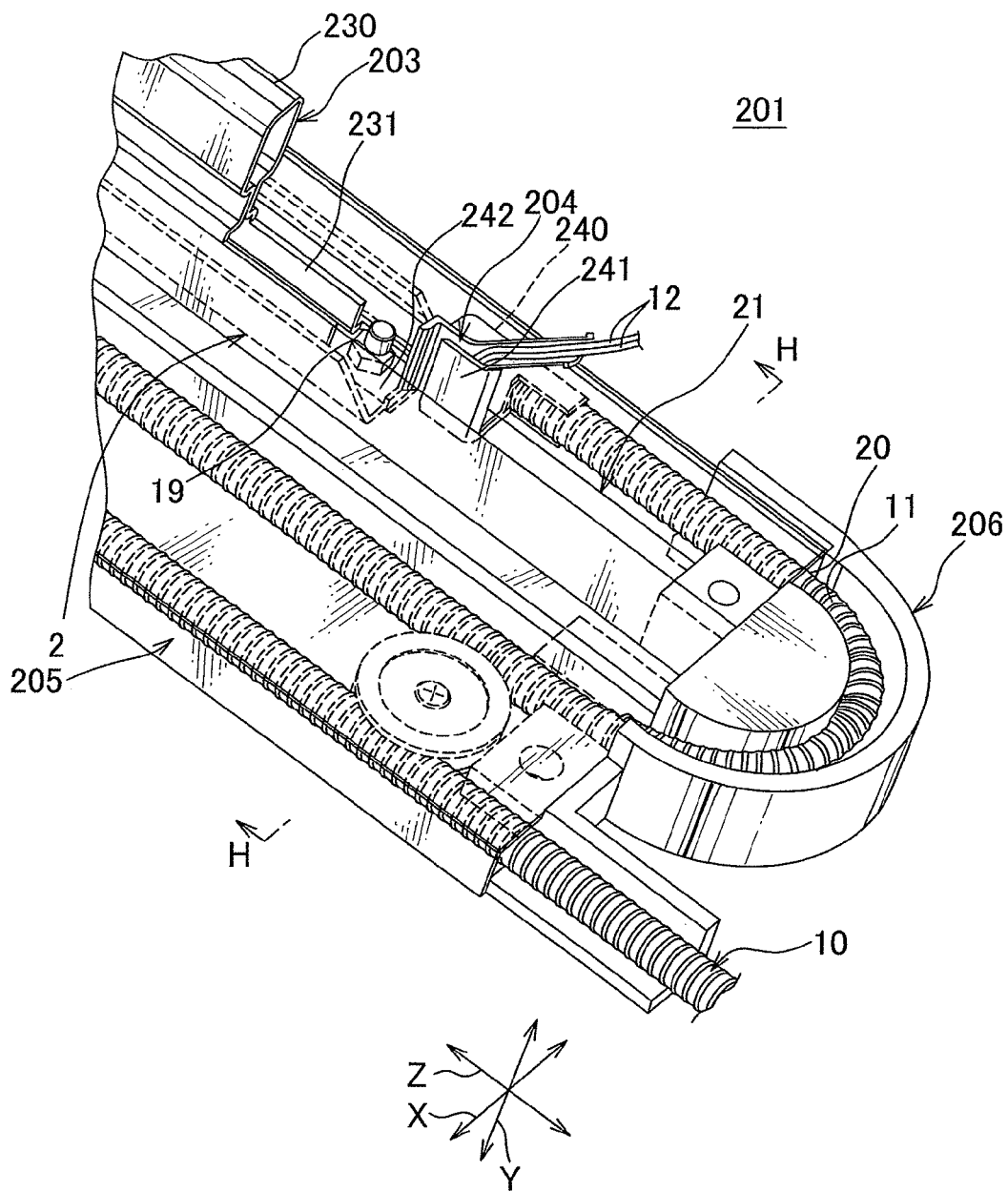
FIG. 20 is a partially expanded view of the wiring-harness routing device shown in FIG. 19.
Figure 21:
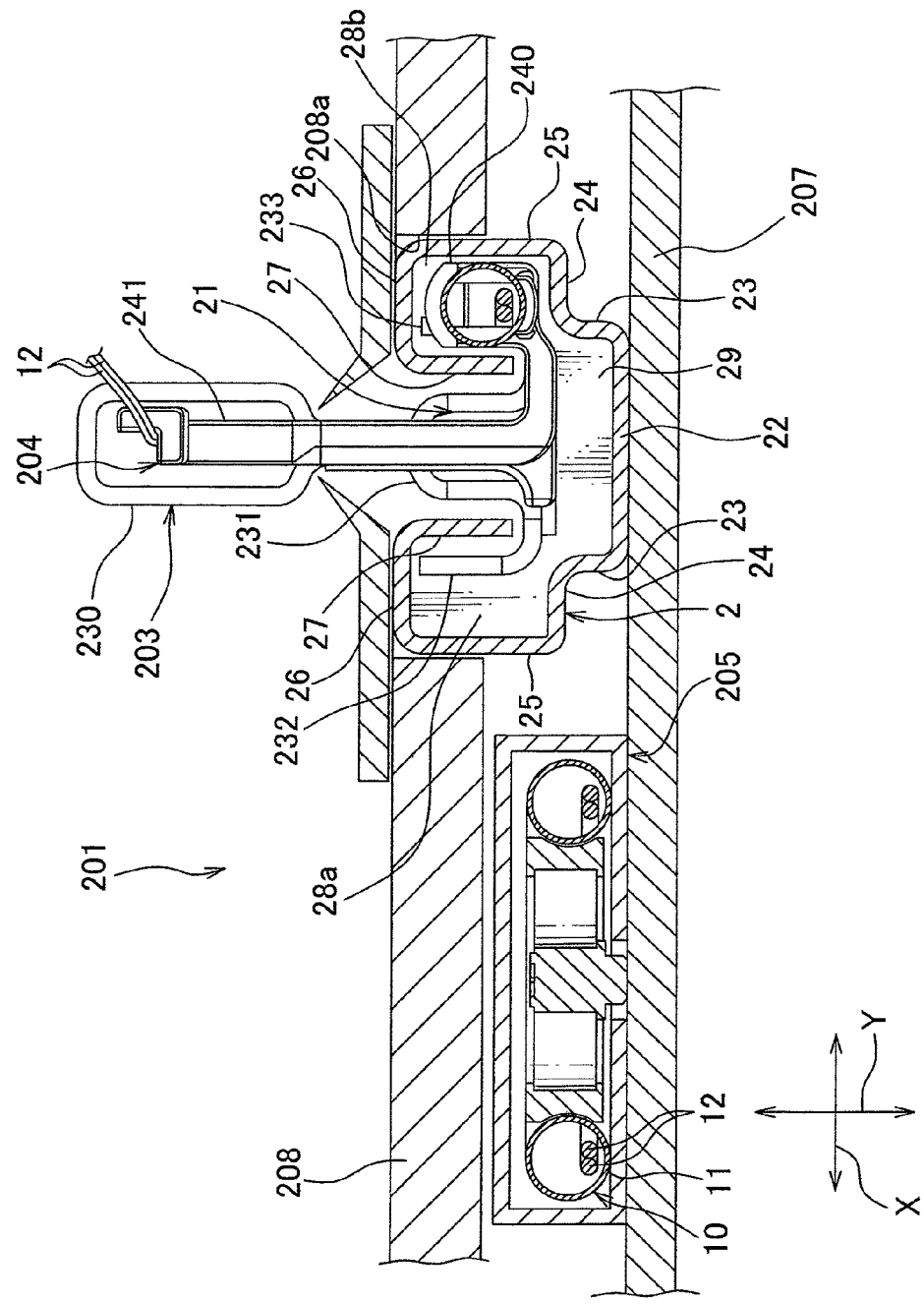
FIG. 21 is a cross-sectional view taken along the line H-H in FIG. 20.

As shown in FIG. 13, a distance W1 between inner surfaces 64a of the second walls 64 of the pair of hook portions 62 is formed larger than a distance W2 between outer surfaces 39a of the pair of projections 39. As shown in FIG. 16, a distance W3 between top ends 65a of the third walls 65 of the pair of hook portions 62 is formed smaller than the distance W2 between the outer surfaces 39a of the pair of projection 39. As shown in FIG. 2, the pair of hook portions 62 is hooked to the pair of projections 39 so as to position each of the pair of projections 39 inside each of the pair of hook portions 62. Thereby, such mount portion 68 is mounted at the support body 3 so as to have a gap allowing motion thereof along the widthwise direction of the rail 2. When the pair of hook portions 62 is hooked to the pair of projections 39, the pair of projections 39 is pulled out of the rail 2, and the pair of hook portions 62 is hooked on the pair of projections 39.

According to the present invention, "the gap allowing motion thereof along the widthwise direction of the rail 2", that is "clearance of subtracting the distance W2 between the outer surfaces 39a of the pair of projections 39 from the distance W1 between the inner surfaces 64a of the second walls 64 of the pair of hook portions 62" may be preferably larger than sum of rattle motion distance along the widthwise direction of the rail 2 when the rattle motion may be generated by sliding the support body 3 in the rail 2" and "tolerance along the widthwise direction of the rail 2 of the support body 3 (that is tolerance of the support body by molding and assembling error)". By providing such gap, even if the support body 3 sliding in the rail 2 has a rattle motion, the lower protector 41 can move about the support body 3 along the widthwise direction, so that the lower protector 41 can slide without corresponding to the rattle motion of the support body 3. When the support body 3 has a tolerance along the widthwise direction of the rail 2, the tolerance can be absorbed by the lower protector 41 moving along the widthwise direction of the rail 2 about the support body 3. Thereby, "protector receiving area in the rail 2" that is "wiring harness receiving area" can be increased. Thus, the wiring-harness routing device 1, which can route more number of electric wires 12, can be provided. In other words, according to the present invention, the protector receiving area in the rail 2 can be given by subtracting "sliding gap of the lower protector 41" and "molding tolerance of the lower protector 41" from "the inner distance of the rail 2".

According to the embodiment, a dimension along the direction arrow X of the pair of wiring-harness hold portion 43 of the lower protector 41 is formed equal to a dimension along the direction arrow X of the pair of spaces 28a, 28b of the rail 2. Thereby, even if the support body 3 moves in the widthwise direction of the rail 2, that is the direction arrow X1 and the direction arrow X2 in FIG. 13 as shown in FIGS. 13-18, when the support body 3 slides in the rail 2, the lower protector 41 arranged in the rail 2 moves little in the direction arrow X1 and the direction arrow X2. As mentioned above, the distance W3 between top ends 65a of the third walls 65 of the pair of hook portions 62 is formed smaller than the distance W2 between the outer surfaces 39a of the pair of projection 39, so that the support body 3 may have rattle motion along the widthwise direction of the rail 2 when the support body 3 slides in the rail 2, but the pair of hook portions 62 hooked at the pair of projections 39 does not fall out of the pair of projections 39.

According to the embodiment, the dimension along the direction arrow Y of the pair of wiring-harness hold portions 43 of the lower protector 41 is formed equal to the dimension along the direction arrow Y of the pair of spaces 28a, 28b of the rail 2. Thereby, the lower protector 41 arranged in the rail 2 moves little in the direction arrow Y, so that the pair of hook portions 62 hooked at the pair of projections 39 does not fall out of the pair of projections 39. In FIGS. 13-18, wiring harness 10 is omitted.

According to the present invention, by hooking the pair of hook portions 62 at the pair of projections 39, the lower protector 41 is mounted at the support body 3 movably along the widthwise direction of the rail 2. Thereby, the support body 3 and the protector 41 can be designed simply, so that the wiring-harness routing device can be easily assembled.

As shown in FIG. 1, the receiving section 5 is to receive the extra length of the two wiring harnesses 10 led through the opening 20 of the rail 2 out of the rail 2. The receiving section 5 includes a first receiving portion 51 curving the two wiring harnesses 10 led from the opening 20 of the rail 2 into a U-shape in parallel, and a second receiving portion 52 further curving and receiving the two wiring harnesses 10, which are curved into a U-shape at the first receiving portion 51, into a U-shape in parallel.

According to the present invention, one receiving section 5 can receives the extra length of the two wiring harnesses 10, so that the compact-designed wiring-harness routing device 1 can be provided.

In the embodiment, the first receiving portion 51 and the second receiving portion 52 are respectively formed as separated components and assembled to each other. The first receiving portion 51 may be made of synthetic resign, and the second receiving portion 52 may be made of metal for maintaining its strength.

As shown in FIG. 1, the first receiving portion 51 includes a pair of guide ribs 53a, 53b passing one of the wiring harnesses 10 therebetween so as to limit a routing path of the wiring harness 10, and a pair of guide ribs 54a, 54b passing the other of the wiring harnesses 10 so as to limit a routing path of the wiring harness.

According to the present invention, the pair of guide ribs 53a, 53b and the pair of guide ribs 54a, 54b are provided, so that the two wiring harnesses 10 can be prevented from interfering to each other near the opening 20 of the rail 2. The wiring-harness routing device 1 which can slide smoothly the two wiring harnesses 10 and the protector 4 can be provided. The guide ribs 53b and 54a arranged between the two wiring harnesses 10 correspond to "partition wall" in claims.

According to the wiring-harness routing device 1, when the seat and the support body 3 move from the one end of the rail 2 to the other end of the rail 2, the protector 4 moves interlockingly with the seat and the support body 3, and the two wiring harnesses 10 are led out of the receiving section 5 and pulled into the pair of spaces 28a, 28b of the rail 2. When the seat and the support body 3 move from the other end of the rail 2 to the one end of the rail 2, the protector 4 moves interlockingly with the seat and the support body 3, and the two wiring harnesses 10 are led out of the pair of spaces 28a, 28b of the rail 2 and pulled into the receiving section 5.

In the embodiment, the protector 4 is separated to the lower protector 41 and the upper protector 42. According to the present invention, single-body protector which is not separated to the lower protector 41 and the upper protector 42 can be used.

In the above embodiment, the corrugate tube 11 is held by molding the one end thereof at the wiring-harness hold portion 43 by insert-mold. According to the present invention, the corrugate tube 11 may be held by clamping the one end thereof by a pair of members of the wiring-harness hold portion.

In the above embodiment, the receiving section 5 is separated to the first receiving portion 51 and the second receiving portion 52. According to the present invention, the one-piece receiving section, which is not separated to the first receiving portion 51 and the second receiving portion 52, can be used.

The present inventions are described based in the embodiments as mentioned above, but the present invention is not limited in above embodiments. Various change and modifications can be made with the scope of the present invention.

MARKINGS

1 Wiring-harness routing device
2 Rail
3 Support body
4 Protector
5 Receiving Section
10 Wiring harness
20 Opening
21 Slit
43 Wiring-harness holding portion
44 First lead portion
45 Second lead portion
68 Mount portion

The invention claimed is:
1. A wiring-harness routing device, which routes a wiring harness between a car body and a slide body, comprising:
 a long-cylindrical rail fixed at the car body and having an opening provided at one end in a lengthwise direction of the rail;
 a support body provided slidably at the rail and supporting the slide body;
 a slit opening at a top surface of the rail;

a protector sliding interlockingly with the support body, and holding the wiring harness led from the opening into the rail and leading the wiring harness through the slit toward an outside of the rail; and a receiving section receiving an extra length of the wiring harness led out from the opening, wherein two wiring harnesses are arranged as the wiring harness, and the protector comprises:

a pair of wiring-harness hold members positioned in the rail and holding the two wiring harnesses to be arranged in parallel to each other along a widthwise direction of the rail;

a lead member arranged between the pair of wiring-harness hold members, and passing electric wires of the two wiring harnesses therethrough, and extending with a cylindrical shape along a height direction of the rail so as to go through the slit and be led to an outside of the rail; and a mount member coupling the support body to the protector with a gap therebetween to allow motion of the protector in the widthwise direction of the rail relative to the support body.

2. The wiring-harness routing device according to claim 1, wherein the support body comprises a pair of projections arranged at an interval to each other along the widthwise direction of the rail, and projecting along the height direction of the rail; and the mount member comprises a pair of U-shape hooks arranged at an interval to each other along the widthwise direction of the rail so as to make openings of the hooks face each other, wherein a distance between each surface of the pair of hooks facing each other is formed larger than a distance between outer surfaces of the pair of projections; and each of the pair of projections is positioned inside each of the pair of hooks so as to arrange the protector at the support body movably in the widthwise direction of the rail.

3. The wiring-harness routing device according to claim 1, wherein the receiving section is provided with a first receiving section curving the two wiring harnesses led from the opening of the rail into a U-shape to keep it in parallel, and a second receiving section curving furthermore the two wiring harnesses, which are curved into a U-shape by the first receiving section, into a U-shape to keep them in parallel.

4. The wiring-harness routing device according to claim 3, wherein the first receiving section includes a partition wall arranged between the two wiring harnesses.

* * * * *